(12) United States Patent  (10) Patent No.: US 9,297,082 B2
Licht  (45) Date of Patent: Mar. 29, 2016

(54) PROCESS FOR SYNTHESIS OF CALCIUM OXIDE

(71) Applicant: The George Washington University, Washington, DC (US)

(72) Inventor: Stuart Licht, Leesburg, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 14/361,911

(22) PCT Filed: Nov. 30, 2012

(86) PCT No.: PCT/US2012/067288
§ 371 (c)(1),
(2) Date: May 30, 2014

(87) PCT Pub. No.: WO2013/082425
PCT Pub. Date: Jun. 6, 2013

(65) Prior Publication Data
US 2014/0339095 A1 Nov. 20, 2014

Related U.S. Application Data

(60) Provisional application No. 61/565,589, filed on Dec. 1, 2011.

(51) Int. Cl.
*C25B 1/18* (2006.01)
*C01B 31/02* (2006.01)
*C01B 31/20* (2006.01)
*C01F 11/06* (2006.01)

(52) U.S. Cl.
CPC . *C25B 1/18* (2013.01); *C01B 31/02* (2013.01); *C01B 31/20* (2013.01); *C01F 11/06* (2013.01)

(58) Field of Classification Search
CPC .......... C25B 1/18; C25B 31/02; C01B 31/20; C01F 11/06
See application file for complete search history.

(56) References Cited

U.S. PATENT DOCUMENTS 3,325,382 A * 6/1967 Le Duc ......................... 205/343
2011/0100832 A1 5/2011 Lubomirsky et al.
2012/0123087 A1 5/2012 Bowles et al.

OTHER PUBLICATIONS

International Preliminary Report issued on Jun. 12, 2014, in International Patent Application No. PCT/US2012/067288, 6 pages.
S. Licht, "Efficient Solar-Driven Synthesis, Carbon Capture, and Desalinization, STEP: Solar Thermal Electrochemical Production of Fuels, Metals, Bleach," Advanced Materials, Oct. 25, 2011, 23(47), pp. 5592-5612.

* cited by examiner

*Primary Examiner* — Arun S Phasge
(74) *Attorney, Agent, or Firm* — Blank Rome LLP; Peter S. Weissman

(57) ABSTRACT

The present invention relates to processes for making calcium oxide electrolytically using calcium carbonate as a starting material. In a direct process, the present invention involves heating calcium carbonate to a temperature greater than its melting point or heating a molten mixture containing calcium carbonate; and subjecting the molten calcium carbonate or molten mixture to electrolysis to generate calcium oxide and oxygen, and a reduced carbon product. In an indirect process, the present invention involves heating solid calcium carbonate in a closed container to cause thermal decomposition to calcium oxide, and directing the evolved hot carbon dioxide byproduct into a molten carbonate solution, and subjecting the hot carbon dioxide molten mixture to electrolysis to generate solid carbon and oxygen, and a reduced carbon product.

22 Claims, 6 Drawing Sheets (A) Low Temperature yields storeable solid carbon with CaO & O2 product.

STEP CO2-free Cement (B) High Temperature yields useful CO with CaO & O2 product.

US 9,297,082 B2

PROCESS FOR SYNTHESIS OF CALCIUM OXIDE

This application is a National Phase of PCT Application No. PCT/US2012/067288, filed Nov. 30, 2012, which claims the priority of U.S. Provisional Patent Application No. 61/565,589, filed Dec. 1, 2011, which is incorporated herein by reference.

FIELD OF THE INVENTION

The present invention relates to processes for making calcium oxide electrolytically using calcium carbonate as a starting material.

BACKGROUND

Cement production accounts for 5-6% of all anthropogenic carbon dioxide emissions. Society consumes a large amount of cement, and the cement industry releases approximately 9 kilograms (kg) of carbon dioxide for each 10 kg of cement produced. An alternative to this carbon dioxide intensive process is needed. The majority of the carbon dioxide emissions occurs during the decarbonation of calcium carbonate, $CaCO_3$, to lime, CaO, while ~40% of these emissions are from burning fossil fuels, such as coal, to heat the kiln reactors to ~900° C.:

$$CaCO_3 + Q_{heat} \rightarrow CaO + CO_2 \qquad (1)$$

$$nC + nO_2 \rightarrow nCO_2 + Q_{heat} \qquad (2)$$

Calcium metal has a melting point of 842° C. $CaCO_3$, as aragonite, decomposes at 825° C., and as calcite melts at 1339° C. In the 19$^{th}$ century, CaO was used to generate intense light, due to its high thermal stability (mp 2572° C.), giving rise to the phrase of being in the limelight. CaO is pervasively used by society. As with cement production, massive $CO_2$ emissions are associated with the CaO formed for iron and aluminum production. Lime combines with silicate, phosphorous or sulfur impurities in metal ores. The products, such as calcium silicate slags, are immiscible, and can be removed from the molten metal. CaO heated with $SiO_2$ and $Na_2CO_3$ forms glass. Lime for agriculture also contributes to carbon dioxide emissions. Lime, on reaction with solid carbon or water or is used in the synthesis of calcium carbide, $CaC_2$, and acetylene, $C_2H_2$. Lime has widespread use in agriculture, and on reaction with solid carbon or water or is used in the synthesis of calcium carbide, $CaC_2$(solid), and acetylene, $C_2H_2$ (gas). CaO is used to make plastics opaque, and to create an alkaline pulp environment for paper production, and in refining sugar. Lime is used to scrub $SO_2$ emissions from smoke stacks as calcium sulfite, $CaSiO_3$, and in water treatment to soften water or remove phosphates from sewerage by precipitation of calcium phosphate, $Ca_3(PO_4)_2$.

In forming CaO, solar thermal reactors have been studied used to replace the fossil fuel heat in eq. 2. However, solar thermal chemical reactions can be inefficient, and the majority of the carbon dioxide emissions still occurs (as decarbonation in eq. 1). In 2009 we introduced the theory of an efficient solar chemical process, based on a synergy of solar thermal and endothermic electrolysis. Solar heat, and the high concentration of molten reactants, substantially decreases the voltage needed to drive the electrolysis. Experimentally, the Solar Thermal Electrochemical Production (STEP) of energetic molecules can synthesize chemicals at solar efficiencies of 50%, hand as been demonstrated with the carbon dioxide free production of metals, fuels, bleach (chlorine) and for carbon capture.

There is a need for a new process for forming CaO without the release of carbon dioxide into the atmosphere.

SUMMARY OF THE INVENTION

One object of the present invention relates to a method for producing calcium oxide by electrolyzing calcium carbonate ($CaCO_3$). This process is also referred to herein as the "direct process" or "direct electrolysis process." The process generally involves heating calcium carbonate to a temperature greater than its melting point or heating a molten mixture containing calcium carbonate; and subjecting the molten calcium carbonate or molten mixture to electrolysis to generate calcium oxide and oxygen, and a reduced carbon product. The principal reduced carbon product is solid carbon at lower temperatures (below approximately 850° C.) or carbon monoxide at higher temperatures (above approximately 850° C.). The temperature at which this switch in carbon products occurs can be controlled by varying the electrolysis conditions (the composition of the electrolyte, electrodes and applied energy). In one embodiment, solar thermal energy can be used to heat the mixture. In another embodiment, non-carbon dioxide emitting source of electricity, such as renewable or nuclear generated power, can be used to drive the electrolysis.

Another object of the present invention relates to a method for producing calcium oxide by heating solid calcium carbonate in a closed container to cause thermal decomposition to calcium oxide, and directing the evolved hot carbon dioxide byproduct into a molten carbonate solution, and subjecting the hot carbon dioxide molten mixture to electrolysis to generate solid carbon and oxygen, and a reduced carbon product. This process is also referred to herein as the "indirect process" or "indirect electrolysis process." The principal reduced carbon product is solid carbon at lower temperatures (below approximately 850° C.) or carbon monoxide at higher temperatures (above approximately 850° C.). The temperature at which this switch in carbon products occurs can be controlled by variation of the electrolysis conditions (the composition of the electrolyte, electrodes and applied energy). In one embodiment, solar thermal energy can be used to heat the mixture. In another embodiment, non-carbon dioxide emitting source of electricity, such as renewable or nuclear generated power, can be used to drive the electrolysis.

BRIEF DESCRIPTION OF THE DRAWINGS

FIG. 2A shows the process at low temperature (<850° C.), while FIG. 2B shows the process at high temperature (>850° C.).

FIG. 5 shows electrolytic carbon and calcium oxide production in molten eutectic or lithium carbonates.

DETAILED DESCRIPTION OF THE PREFERRED EMBODIMENT

Figure 1:
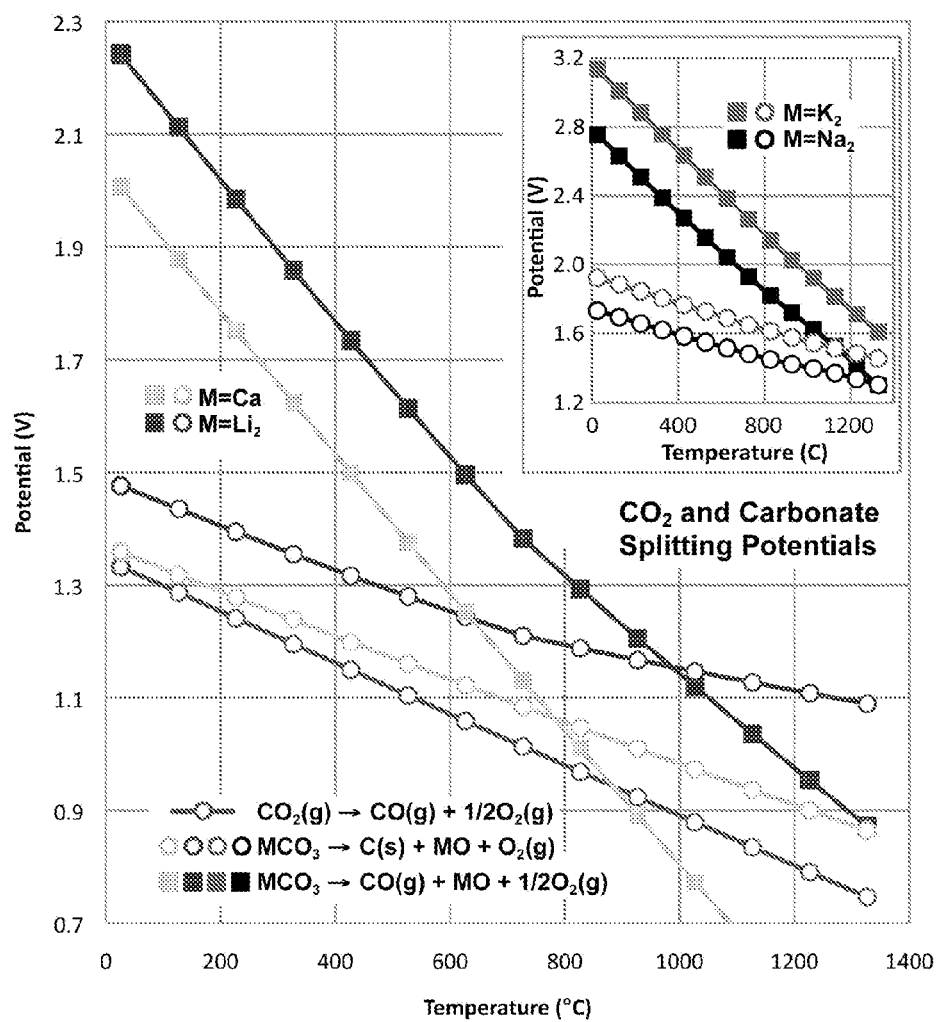
FIG. 1 is a graph showing the thermodynamic potential to electrolyze calcium carbonate in the carbon free production of lime. The calculated energy to electrolyze calcium carbonate is less than that for lithium carbonate (main figure), which in turn, is less than that of sodium and potassium carbonates (inset). Electrolysis potentials are calculated from the thermochemical enthalpies and entropies of the reactants.

The direct method involves electrolyzing calcium carbonate to form calcium oxide. Preferably, the method involves electrolyzing molten carbonates to produce oxides, oxygen, and a reduced carbon product. The addition of calcium carbonate to the molten carbonates forms insoluble calcium oxide. For example, molten lithium oxide, when electrolyzed in the absence of calcium carbonate forms soluble lithium oxide, oxygen, and a reduced carbon product. However, in the presence of calcium carbonate forms the desired insoluble calcium oxide synthesis product, oxygen, and a reduced carbon product. Sufficient calcium carbonate is needed to induce calcium oxide precipitation. "Sufficient" is defined as a concentration greater than the low solubility limit of calcium oxide. For example in a molten lithium oxide from 750 to 950° C., the solubility limit of calcium oxide is less than 0.3 moles per kilogram lithium carbonate. In a preferred embodiment, the calcium carbonate is added following the electrolysis. In this embodiment, the insoluble calcium oxide product has a higher density than alkali either or alkali earth carbonates and forms on the bottom of the electrolysis vessel where it is readily collected. In another preferred embodiment, the calcium carbonate is dissolved in the molten carbonate prior to, or during, the electrolysis.

As used herein, the phrase "molten carbonates" refers to molten carbonates that are not calcium carbonate and includes alkali carbonates, such as lithium carbonate, sodium carbonate, potassium carbonate and mixtures of two or more of the foregoing alkali carbonates. The molten carbonates can also include other carbonates, such as barium carbonate. Further, the molten carbonates can also include oxides of the carbonates, lithium oxide, sodium oxide, potassium oxide, and/or barium oxide. Preferably, lithium oxide and/or barium oxide is used. Mixtures of alkali carbonates can be advantageous due to lower melting points. For example $Li_{0.7}Na_{0.93}CO_3$ has a melting point of 499° C. and $Li_{0.85}Na_{0.6}K_{0.54}CO_3$ has a melting point of 393° C. and these melting points are compared to the melting points of alkali carbonates ($Li_2CO_3$ 723° C., $Na_2CO_3$ 851° C., $K_2CO_3$ 891° C.). Alternatively, calcium carbonate can also be used pure (not dissolve in molten carbonates, but this process must be operated under high $CO_2$ pressure to maintain its molten state and prevent thermal decomposition, which is complicated.

The sodium/lithium carbonate eutectic, $Li_{1.07}Na_{0.93}CO_3$, has a melting point of 499° C., but can decrease to below 450° C. if either 2 to 10 mol % equimolar $CaCO_3$ or $BaCO_3$ is added. $K_2Ca(CO_3)_2$ forms as a double carbonate polymorph as either butschliite or fairchildite. The latter has a higher melting point of 809° C. A third double carbonate, with one Ca per K, $K_2Ca_2(CO_3)_3$, at T<527° C., decomposes to $K_2Ca(CO_3)_2+CaCO_3$, but at higher temperatures is stable and melts at 810° C. The maximum solid solution of calcium carbonate in sodium or potassium carbonate is respectively 16 and 11 weight percent, and that at 1 kbar $Na_2Ca(CO_3)_2$ (nyerereite) melts at 817° C., while $K_2Ca(CO_3)_2$ (fairchildite) has a melting point (mp) of 809° C. Sodium and/or potassium calcium eutectics have also been reported, first with mp 665° C., by mass percent, 32.0% sodium, 44.5% potassium, and 23.5%, calcium carbonates, that is with the stoichiometry $Na_{0.703}K_{0.75}Ca_{0.273}CO_3$; then with mp 725° C.-$Na_{1.550}Ca_{0.225}CO_3$, with mp 813° C.-$Na_{0.912}Ca_{0.544}CO_3$, with mp 735° C.-$K_{1.404}Ca_{0.298}CO_3$, and with mp 790° C.-$K_{0.919}Ca_{0.541}CO_3$.

Molten carbonate fuel cells (MCFC) systems have been studied in greater depth than carbonate electrolysis. Molten carbonate electrolysis operates in the reverse mode of MCFCs; rather than fuel in and electricity as a product, electrical energy is input and energetic products are generated. Ni is a useful cell or electrode candidate material in MCFCs, but slowly degrades via a soluble nickel oxide overlayer. It has been reported that the of addition of 10% $CaCO_3$ to 650° C. $Li_{1.04}Na_{0.96}CaCO_3$ is useful to decrease the solubility of NiO from 150 to 100 μmolal in the carbonate mix. In one MCFC study, the addition of 10 mol % of $CaCO_3$ to a molten carbonate (either $Li_{1.04}Na_{0.96}CO_3$ with 30 mol % $CaCO_3$, or $L_{1.24}Na_{0.76}CO_3$ with 10 mol % $CaCO_3$) led to a disadvantageous decrease of 50 mV in the 150 mA cm$^{-2}$ cell potential at 600 to 700° C., and did not significantly change the electrolyte resistivity. A decrease in potential, while disadvantageous to a fuel cell is advantageous (lower energy to form the product) in an electrosynthetic cell.

Appropriate sources for calcium carbonate include limestone, such as calcite, agaronite, and vaterite. Preferably, calcite, agaronite, or combination thereof is used.

We calculate here the required thermodynamic calcium carbonate electrolysis potential from the enthalpy and entropy of the components, and these values are summarized in FIG. 1. As evident in the figure, the required potential is lower for calcium carbonate than that the comparable potentials we have previously calculated for lithium, sodium or potassium carbonate electrolysis. As we have calculated and experimentally observed and calculated for lithium carbonate electrolysis, it is expected that a high ratio of molten carbonate reactant to product will also decrease the potential required to electrolyze calcium carbonate to less than the unit activity values summarized in the figure. Below 850° C., the expected carbon electrolysis product of calcium carbonate is solid carbon, while above that temperature a carbon monoxide product is favored. It can also be noted in FIG. 1 that this carbon product cross over temperature occurs at about 150° C. cooler in calcium carbonate compared to lithium carbonate.

Solar thermal energy can significantly decreases the required electrolysis energy of these endothermic reactions to below that required at room temperature. A process of a carbon dioxide free process for the production of calcium oxide (STEP cement) is presented here in which molten calcium carbonates are electrolyzed to oxygen and reduced carbon, and producing calcium oxide.

In the direct electrolysis process, calcium carbonate is preferably dissolved with other molten carbonates, or may be used pure. In any event, electrolysis of the molten calcium carbonate forms the calcium oxide. The first case includes low temperature (< about 850° C.) melts of alkali carbonates with calcium carbonate, which can be electrolyzed at low $CO_2$ pressure, including under air. Preferably, the low $CO_2$ pressure is less than about 10 atm, more preferably about 0.03 to about 10 atm, most preferably about 0.03 to about 0.1 atm. The low pressure is the preferred as it is simpler to operate.

The latter case of pure calcium carbonate electrolysis requires high $CO_2$ pressure to maintain the calcium carbonate in the molten phase and prevent evolution of carbon dioxide via $CaCO_3$ thermal decomposition. Preferably, the high $CO_2$ pressure is greater than about 10 atm, more preferably about 10 to about 1000 atm.

The process using pure calcium carbonate has the advantages of simplicity to remove the product as calcium oxide, but requires the high operational carbon dioxide pressure. The carbonate mix has the advantages of a wider temperature range including low temperature melts, to suppress or eliminate decomposition and carbon dioxide evolution, even under atmospheric (0.03%) concentrations of $CO_2$. Of the pure alkali carbonates, $Li_2CO_3$ has the lowest melting point at 723° C. Mixed alkali carbonate melting points can be low, including 393° C. for the $Li_{0.85}Na_{0.61}K_{0.54}CO_3$ and 695° C. for the $Na_{1.23}K_{0.77}CO_3$ eutectic salts. In addition to the desired calcium oxide product, lower temperature electrolysis favors a solid carbon, rather than a carbon monoxide product at the cathode, while higher temperature electrolysis has the advantage of a lower electrolysis potential and lower electrolysis overpotential.

In the direct electrolysis process, calcium carbonate may be added to electrolyzed solar thermal heated molten alkali carbonate to form calcium oxide. The solar thermal heat decreases, $Q_{solar}$, decreases the energy, $E_{electrolysis}$, required to form the products:

below 850° C.: $CaCO_{3\ molten} + Q_{solar} + E_{electrolysis} \rightarrow CaO + C + O_2$ (3)

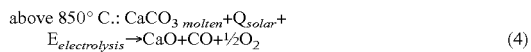

above 850° C.: $CaCO_{3\ molten} + Q_{solar} + E_{electrolysis} \rightarrow CaO + CO + ½O_2$ (4)

The room temperature density of CaO (3.35 g/cm³) is greater that of $Li_2CO_3$ (2.11 g/cm³), $Na_2CO_3$ (2.54 g/cm³), $K_2CO_3$ (2.29 g/cm³), or $CaCO_3$ (2.81 (aragonite) or 2.71(calcite) g/cm³). Hence, either in the pure calcium carbonate or carbonate mix, beyond the saturation CaO formed will tend to sink to the bottom of electrolysis chamber to be collected, as represented in FIG. 1. Following electrolysis in the pure carbonate, calcium oxide may also be removed as a CaO enriched calcium oxide/carbonate mix. The oxygen product of the electrolysis is evolved at the anode. From lower temperature melts, the cathode product is solid carbon, which may be readily stored. At higher temperature, a CO product may be useful as an industrial reactant, for example, to produce fuels, to purify nickel, and to form plastics and other hydrocarbons. As we have previously demonstrated, the electrolysis of carbonates is endothermic.

Figure 2:
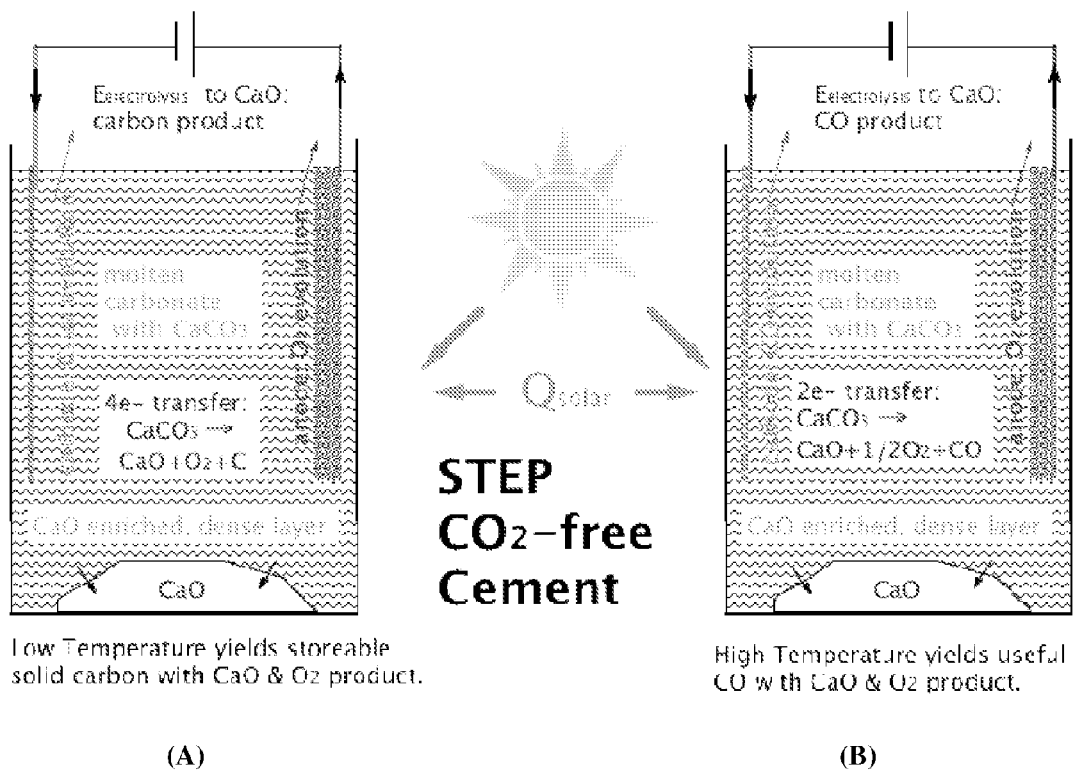
FIG. 2 is a drawing showing the direct process incorporating solar thermal and electrochemical production of calcium oxide by the direct solar conversion of calcium carbonate (limestone) to calcium oxide (lime).

The direct STEP evolution of CaO from calcium carbonate is described in FIG. 2, including either a solid carbon product (eq. 3, FIG. 2A) on the right side, or a carbon monoxide product (eq. 4, FIG. 2B) on the left side. The direct STEP process eliminates $CO_2$ that would have been emitted in the conventional thermal decomposition of $CaCO_3$. Carbonate electrolysis is endothermic requiring lower potential at higher temperature or carbonate concentration. Solar thermal provides the heat to lower this $E_{electrolysis}$. The low $E_{electrolysis}$ is provided by photovoltaic cells or wind (preferred) or an electronic charge source, and is fully carbon dioxide free, when the requisite low energy of the solar heated electrolysis is generated by a non-fossil fuel electricity source.

The supersaturated CaO may be removed from the melt as a precipitate. Alternatively, the CaO enriched melt, e.g., collected as a dense slurry from the bottom of the electrolyzer such as through a spigot.

Figure 3:
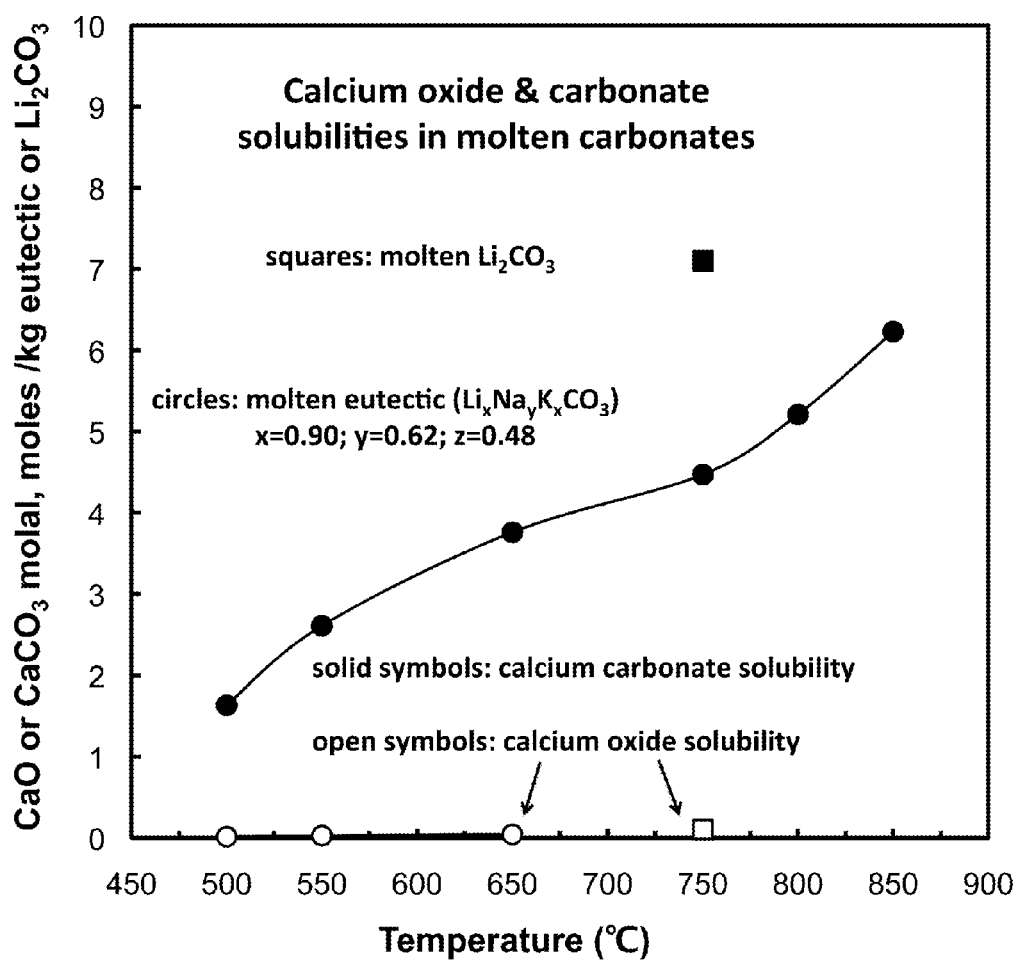
FIG. 3 is a graph showing the solubility of calcium oxide and calcium carbonate in molten carbonates.

FIG. 3 compares the solubility of calcium oxide and calcium carbonate, in either molten lithium carbonate (squares) or a molten alkali eutectic (circles, $Li_{0.90}Na_{0.62}K_{0.48}CO_3$). Of significance is the low solubility of calcium oxide relative to that of calcium carbonate. In both the eutectic and in the pure lithium carbonate, the solubility of calcium oxide is one to two orders of magnitude lower than the solubility of calcium carbonate. Hence, in the electrolytic formation of CaO, from highly soluble calcium carbonate, product formed at a concentration beyond this low solubility will precipitate for extraction of this CaO desired product. The electrolyte may then be replenished for continued CaO production, by the ongoing addition of calcium carbonate.

At low temperatures, such as for a 500° C. molten carbonate eutectic, the molten carbonate is highly stable, but with increasing temperature molten metal carbonates will decompose, releasing carbon dioxide and forming the metal oxide, such as for lithium carbonate:

$Li_2CO_3 \rightarrow Li_2O + CO_2$ (5)

We have previously studied the equilibrium equation 5 as a function of temperature, both with thermodynamic calculations and experimental measurements. We experimentally demonstrated that the addition of $Li_2O$ or $CO_2$ (by replacing air with 1 atm of $CO_2$ above the melt) prevents decomposition of the carbonate melt. Accordingly, the direct process can be improved by the presence of $Li_2O$. $Li_2O$ may be added at about 0.1 m $Li_2O$ (where m is defined as moles $Li_2O$ per kg of $Li_2OCO_3$) to about 10 m $Li_2O$, preferably about 0.5 m $Li_2O$ to about 0.6 m $Li_2O$, more preferably about 1 m $Li_2O$ to about 4 m $Li_2O$.

Prior art methods for making CaO for cement involves the thermal decomposition of solid $CaCO_3$ at 900° C. in accord with equation 1. Our thermogravimetric analyses of carbonates under various conditions are summarized in the Table 1. As seen in the top row, 97.5% (percent of the initial total mole of carbonate) of solid calcium carbonate decomposes with emission of $CO_2$ after 5 hours of heating at 900° C. This loss is relative, as it will also depend on the surface area of exposed salt. At 750° C. this value falls from 97.5% to 16.0%. Lithium carbonate is molten at 750° C. and loses only 1.8 mol 1.8 mol % under the same conditions. Under these conditions 12 g of $CaCO_3$ dissolved in 20 g of $Li_2CO_3$ exhibits 3.2% decomposition, a value which is intermediate to those measured for pure molten $Li_2CO_3$ or pure solid $CaCO_3$ at 750° C. As expected, lowering the temperature (to 735° C.) and lowering the fraction of dissolved calcium carbonate (10 g $CaCO_3$ to 20 g $Li_2CO_3$) decreases the observed decomposition (to 3.0%).

In accord with equation 5, the addition of $Li_2O$ to molten lithium carbonate drives the equilibrium to the left. Air contains 0.03% $CO_2$. A molten mix consisting of 3 g (5 molal) $Li_2O$ dissolved in molten 20 g of $Li_2CO_3$ actually gains mass in time, evident as a 1.6 mol % gain in carbonate in the table. As we have previously noted, this is significant as it provides a path for the direct absorption (and STEP removal) of atmospheric carbon dioxide. The measurement is quiescent; the molten mix is exposed directly to air. The rate of direct $CO_2$ absorption increases with stirring or when air is bubbled into the molten mix. Note that these high lithium oxide experiments are conducted for shorter periods of time (2 hours, rather than 5 hours) as the alumina crucible reacts with the concentrated $Li_2O$ (to form soluble lithium aluminate). In working electrolysis cells, we avoid this oxidative attack by using stainless steel or nickel cell cases, which are maintained under cathodic bias. The alumina crucible reaction is slow, but measureable under these conditions, and 0.24 g of alumina (as measured by mass loss from the crucible mass) enters the solution over this time period. The alumina crucible mass loss decreases to 0.06 g with the addition of $CaCO_3$ (12 g) to the 3 g $Li_2O$ in 20 g $Li_2CO_3$ molten mix.

counter electrode (28 $cm^2$ cathode for the 0.5 $cm^2$ anode measurements, and a 28 $cm^2$ anode for the 0.5 $cm^2$ cathode current density measurements). The bottom portion of the figure (open symbols) summarizes cathode constrained electrolysis potentials, and the top portion of the figure (closed symbols) anode constrained electrolysis potentials. In the anode constrained measurements, it is seen that electrolysis

TABLE 1

| Carbonate mil-mol | Mass, g | | | | | | *T | #t | Phase | Mass change, g, after heating | $CO_2$ milli-mol | Δmole carbonate after heating mole % |
|---|---|---|---|---|---|---|---|---|---|---|---|---|
| | $CaCO_3$ | $Li_2CO_3$ | $Na_2CO_3$ | $K_2CO_3$ | CaO | $Li_2O$ | | | | | | |
| 200 | 20.003 | 0 | 0 | 0 | 0 | 0 | 900 | 5 | solid | −8.58 | −195. | −97.5% |
| 200 | 20.003 | 0 | 0 | 0 | 0 | 0 | 750 | 5 | solid | −1.40 | −31.9 | −16.0% |
| 271 | 0 | 20.007 | 0 | 0 | 0 | 0 | 750 | 5 | molten | −0.21 | −4.79 | −1.8% |
| 391 | 12.001 | 20.001 | 0 | 0 | 0 | 0 | 750 | 5 | molten | −0.56 | −12.7 | −3.2% |
| 371 | 10.002 | 20.000 | 0 | 0 | 0 | 0 | 735 | 5 | molten | −0.48 | −11.0 | −3.0% |
| 200 | 0 | 20.003 | 0 | 0 | 0 | 3.044 | 750 | 2 | molten | +0.14 | +3.26 | +1.6% |
| 391 | 12.001 | 20.003 | | | 0 | 3.030 | 750 | 2 | molten | −0.020 | −0.44 | −0.11% |
| 391 | 12.000 | 20.002 | | | 0 | 0.061 | 750 | 5 | molten | −0.40 | −9.07 | −2.3% |
| 391 | 12.000 | 20.002 | | | 0.113 | 0 | 750 | 5 | molten | −0.35 | −7.85 | −2.0% |
| 253 | 6.932 | 0 | 9.439 | 13.126 | 0 | 0 | 750 | 5 | molten | −0.11 | −2.56 | −1.0% |
| 252 | 6.905 | 0 | 9.403 | 13.076 | 0 | 0 | 850 | 5 | molten | −0.47 | −10.6 | −4.2% |

*T = temperature in ° C.;
t = time in hours.

The carbonate decomposition is also probed in the mix with calcium rather than lithium oxide in the 12 g $CaCO_3$ in 20 g $Li_2CO_3$ mix at 750° C. CaO is substantially less soluble than $Li_2O$ in molten carbonates. As evident in Table 1, the addition of oxides suppresses carbon dioxide emission from molten lithium/calcium carbonate electrolyte mixes, which is of relevance to STEP cement. Conditions are probed in an electrolyte containing a slight excess of CaO to recreate calcium oxide production precipitating (beyond saturation) conditions. Compared to the 3.2 mol % carbonate loss without oxide, the addition of 2 millimole (0.06 g) $Li_2O$ or CaO (0.11 g), respectively, decreases the mol loss to 2.3 or 2.0%. These are measured under 1 atmosphere of air. However, if the concentration of carbon dioxide is increased or if lithium oxide concentration is increased, then equilibrium equation 5 is shifted to the left (back towards the carbonate).

Figure 4:
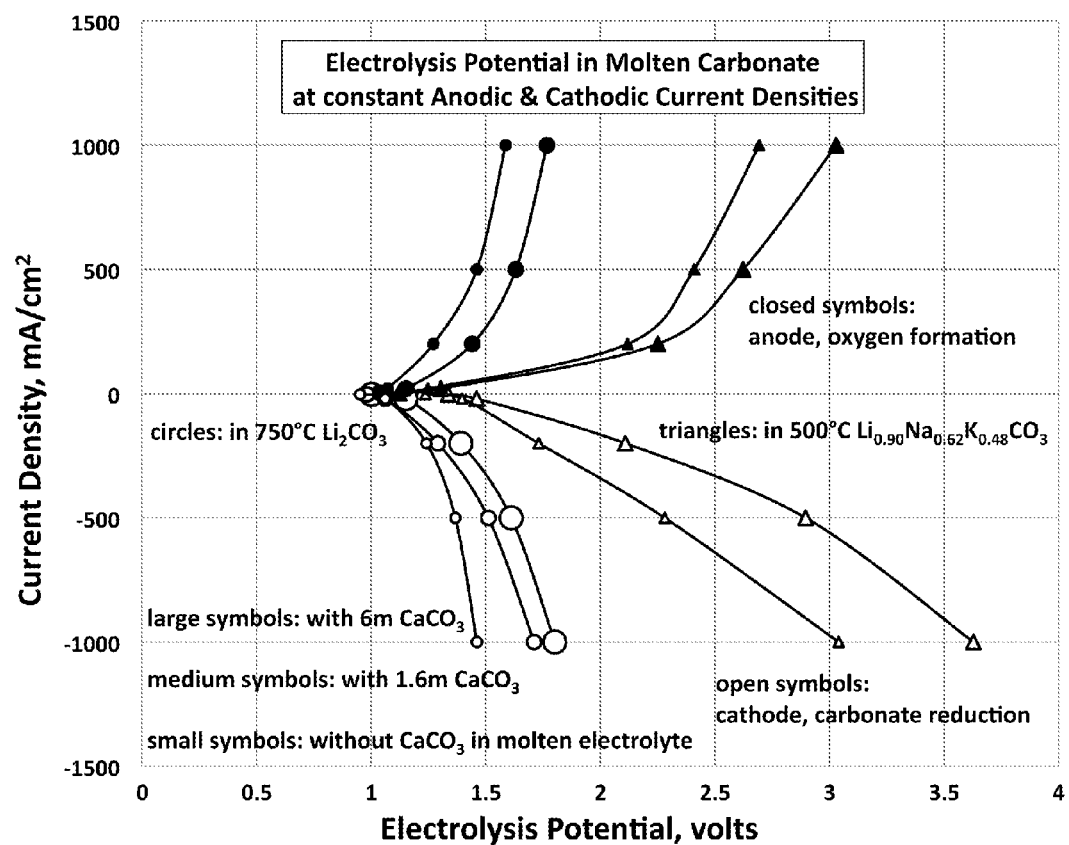
FIG. 4 is a graph showing the variation of the measured electrolysis potential in molten carbonates as a function of either the cathode, or anode, constrained current densities. Electrolysis potentials are measured in either lithium carbonate at 750° C. or eutectic carbonate at 500° C., and as indicated on the figure either with, or without, added calcium carbonate. In the lower portion of the figure, the cathode is iron wire, and in the upper portion of the figure, the anode is either nickel or iridium wire which both yield similar electrolysis potentials.

FIG. 4 summarizes the electrolysis potential measured during the production of calcium oxide from $CaCO_3$ dissolved in molten carbonate, and also the electrolysis potential in the absence of $CaCO_3$. Calcium oxide is formed at low energy (low electrolysis potential) and at high rate (high current densities). Presented in FIG. 4 are the full electrolysis potentials as a function of current density in a system constrained by the electrode surface area (either the anode or cathode surface area). Nickel and iridium are effective anode materials; and iron or steel are effective cathode materials. The cathode measurements are made with a nickel crucible (Alfa Aesar 3592-KT straight wall 20 ml) whose inner walls contacting the electrolyte serve as the anode counter electrode. Other effective anode materials include metals such as platinum; metal oxides such as nickel oxide; metal alloys such as monel and inconel; and carbon based materials such as glassy carbon and graphite. Enhanced anode surface area, such as with screen or spongy materials, by physical roughening, by chemical or electrochemical etching, or as deposited on a conductive support, are also appropriate.

The anode measurements summarized in FIG. 4 are made with a steel crucible (VWR 82027-540 30 ml) whose inner walls contacting the electrolyte serve as the cathode counter electrode. These measurements are made with an oversized can be sustained at very high current densities, and that in this high current density domain, the dissolution of 1.6 m calcium carbonate in the carbonate eutectic increases the electrolysis potential by ~400 mV. The electrolysis potential is similar with either an 0.5 $cm^2$ nickel or iridium anode, but is marginally (not shown) higher when measured with an 0.5 $cm^2$ platinum anode. Nickel is a highly stable anode for electrolysis in carbonates, and iridium is remarkably stable (with no evidence of mass loss or oxidation after hundreds of hours of anode operation over a wide range of current densities, even at higher temperatures (up to 900° C. in molten lithium carbonate).

As previously mentioned, at lower temperatures (< about 850° C.), carbon forms readily from molten carbonates at the cathode; and at higher temperatures (> about 850° C.), the cathode product switches to carbon monoxide formation. In the temperature range studied in FIG. 4 (500 or 750° C.) the cathode product is carbon. The lower portion of the figure comprises cathode measurements made with a 0.5 $cm^2$ iron electrode, which is an effective cathode for electrolysis in either the eutectic carbonate or the lithium carbonate. As with the anode constrained results, the cathode constrained electrolysis potentials are observed to increase upon addition of calcium carbonate to the electrolyte.

Figure 5A:
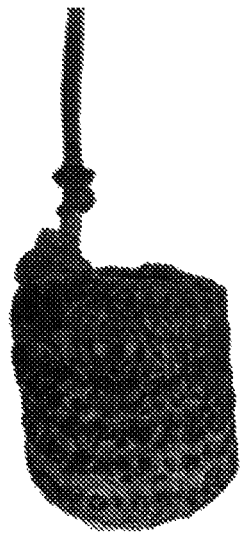
FIG. 5A is a photo showing carbon deposited on a clean coiled iron cathode following two hours of electrolysis at 1 A in 500° C. molten eutectic carbonate containing 1.6 m $CaCO_3$.
Figure 5B:
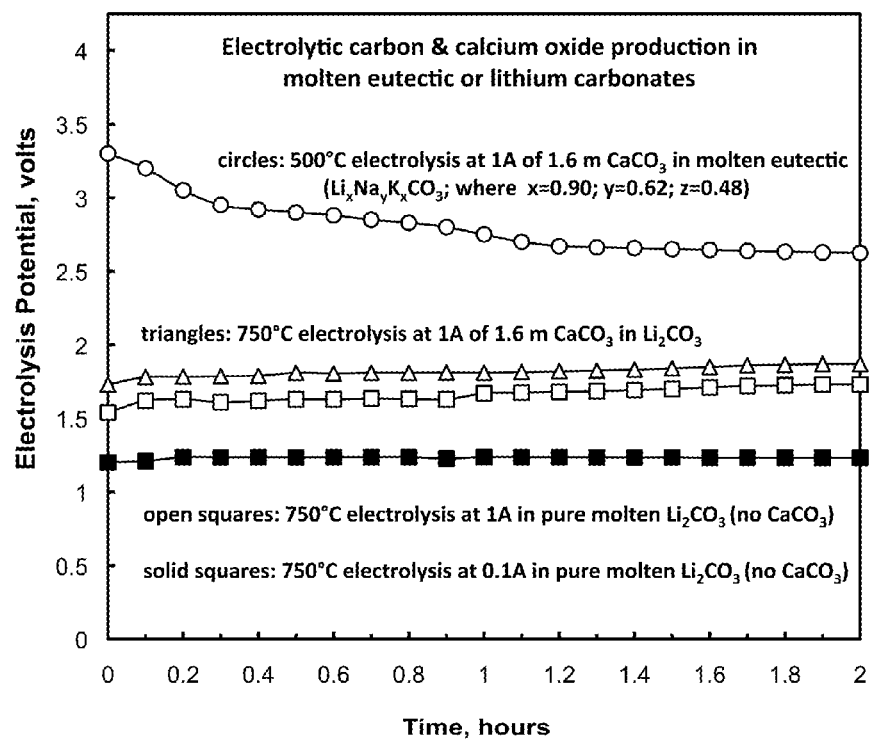
FIG. 5B is a graph showing electrolysis potential as a function of time.

Constant current electrolysis over extended time produces CaO and simultaneously produces a highly uniform, extractable carbon. Beyond the solubility point, this CaO product precipitates. As seen in FIG. 5A, the carbon deposits on the cathode (photo below), while oxygen evolves from the anode. The net result is CaO, C, and oxygen without carbon dioxide evolution. The photo shows the carbon deposited after 2 hours at a constant 1 amp current. The cathode is 10 $cm^2$ of a 21.2 cm long, 1.5 mm, iron wire, which has been coiled. The anode is nickel, and consists of the inner submerged walls (28 $cm^2$) of a 20 ml straight walled nickel crucible (Alfa Aesar #35953). The electrolyte is 1.6 m (6 g) calcium carbonate in 40 g molten eutectic at 500° C. During the electrolysis 29% of the calcium carbonate is converted to CaO, equivalent to an effective concentration of 0.47 m CaO. However this is above the FIG. 2 solubility, and form extractable CaO. In accord with the anode and cathode constrained constant electrolysis potentials observed in FIG. 5B, the electrolysis decreases with either increasing temperature or decreasing current. Electrolyses have also been performed for 5 hours (which are longer than the two hours shown in FIG. 5B, and these extended electrolyses continue smoothly at an electrolysis potential similar to the two hour values.

Figure 6:
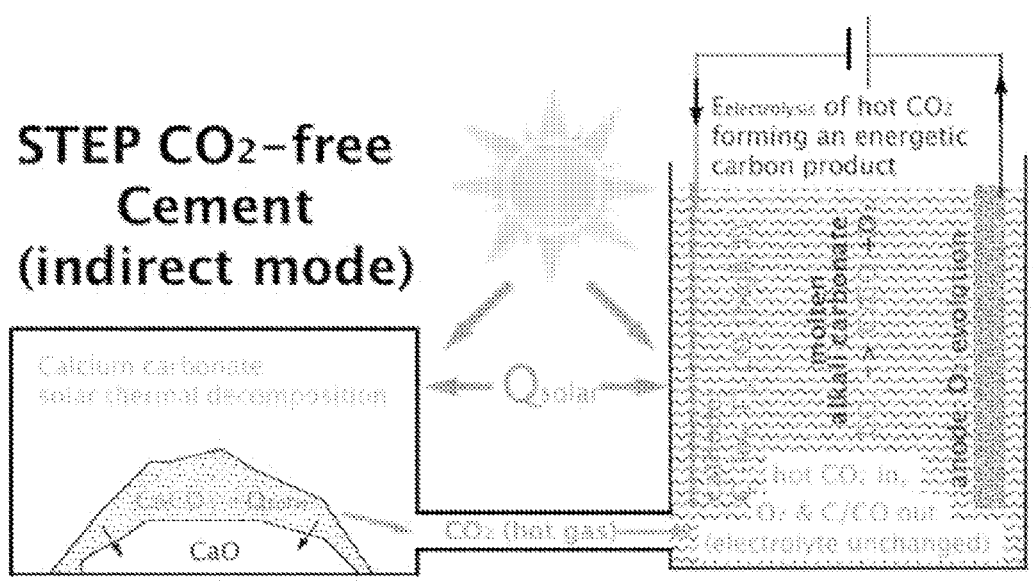
FIG. 6 is a drawing showing the indirect process incorporating solar conversion of calcium carbonate to calcium oxide (lime).

The present invention also relates to an indirect process for producing calcium oxide which is summarized in FIG. 6. This process involves thermal decomposition of calcium carbonate at a temperature at or above its decomposition temperature (>900° C.) (shown on the left side of FIG. 6. The hot $CO_2$ produced is then led to a molten carbonate reactor and electrolyzed to carbon and oxygen. The indirect process differs from the prior art processes for producing calcium oxide (by thermal decomposition of calcium carbonate) in that the hot $CO_2$ produced during decomposition is further electrolyzed in hot carbonates to produce C and $O_2$. The prior art methods essentially release the $CO_2$ to the environment. Preferably, the energy used to heat the molten carbonates and the thermal decomposition is obtained, at least partially, from solar energy. As shown in FIG. 6, concentrated solar energy heats the solid calcium carbonate to over 900° C. to produce calcium oxide and releasing hot carbon dioxide at approximately the same temperature. As in conventional calcium carbonate lime production, the CaO is removed as the solid. The partial reaction, that occurring in the chamber on the left side of FIG. 6, is as shown in equation 6 which is identical to equation 1, except that the $CO_2$ is released into the chamber on the left side chamber from the closed reactor.

$$CaCO_{3\ solid} + Q_{solar} \rightarrow CaO + CO_{2\ gas\text{-}hot} \quad (6)$$

The hot $CO_2$ is then reduced in a molten carbonates, in which the electrolyte is preferably unchanged in the course of the electrolysis. In the molten carbonates, the introduced $CO_2$ is electrolyzed and converted to oxygen and solid carbon at lower temperatures (< about 850° C.), or to carbon monoxide (at carbon product crossover temperatures which depend on the composition of the molten carbonate electrolyzer). At higher temperatures (> about 850° C.), such as the 900° C. available from the incident carbon dioxide gas, carbon monoxide is the preferred product:

$$\text{Conversion to alkali carbonate: } CO_{2\ gas\text{-}hot} + M_2O_{\text{-}dissolved} \rightarrow M_2CO_{3\ molten} \quad (7)$$

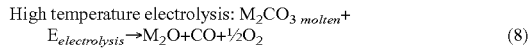
$$\text{High temperature electrolysis: } M_2CO_{3\ molten} + E_{electrolysis} \rightarrow M_2O + CO + \tfrac{1}{2}O_2 \quad (8)$$

where M refers to alkali or alkali earth metals.

Equations 7 and 8, combined with equation 6, yield the same net high temperature, $CO_2$-free products as equation 4:

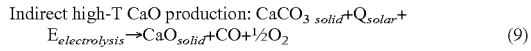
$$\text{Indirect high-T CaO production: } CaCO_{3\ solid} + Q_{solar} + E_{electrolysis} \rightarrow CaO_{solid} + CO + \tfrac{1}{2}O_2 \quad (9)$$

At lower temperatures (< about 850° C.), carbon is the preferred product:

$$\text{Conversion to alkali carbonate: } CO_{2\ gas\text{-}hot} + M_2O_{\text{-}dissolved} \rightarrow M_2CO_{3\text{-}molten} \quad (10)$$

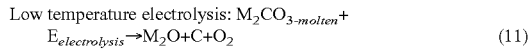
$$\text{Low temperature electrolysis: } M_2CO_{3\text{-}molten} + E_{electrolysis} \rightarrow M_2O + C + O_2 \quad (11)$$

Equations 10 and 11, combined with equation 6, yield the same net low temperature, $CO_2$-free products as equation 3:

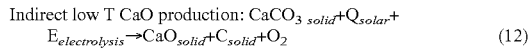
$$\text{Indirect low T CaO production: } CaCO_{3\ solid} + Q_{solar} + E_{electrolysis} \rightarrow CaO_{solid} + C_{solid} + O_2 \quad (12)$$

In the overall reactions (9 or 12) no carbon dioxide is emitted from the CaO production.

For both the direct and indirect processes, the C or CO may be used to make other products, either directly in the electrolysis vessel or in a separate process. For example, the addition of hydrogen containing species, such as through controlled addition of steam to the molten mixture, can lead to the further reaction of C or CO to produce hydrocarbons.

For both the direct and indirect processes, it is preferred that the energy used is at least partially produced using non-fossil fuel derived energy, which includes, but is not limited to, solar, wind, nuclear, and hydroelectric sources. Those energy sources are preferably used to heat the molten material and to provide electricity for electrolysis.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A process for producing calcium oxide comprising the step of electrolyzing a molten mixture containing calcium carbonate in an electrolysis vessel to produce calcium oxide, oxygen, and a reduced carbon product, wherein the calcium oxide collects on the bottom of the electrolysis vessel.

2. The process of claim 1, wherein the calcium carbonate is dissolved in the molten mixture subsequent to or prior to electrolysis.

3. The process of claim 2, wherein the molten mixture further comprises lithium carbonate, potassium carbonate, sodium carbonate, barium carbonate, or combinations thereof.

4. The process of claim 2, wherein the molten mixture comprises lithium oxide.

5. The process of claim 1, wherein the reduced carbon product is carbon.

6. The process of claim 1, wherein the reduced carbon product is carbon monoxide.

7. The process of claim 1, wherein the calcium oxide is a precipitate.

8. The process of claim 1, wherein the electrolysis vessel is exposed to the atmosphere.

9. The process of claim 1, wherein the electrolysis is conducted with a carbon dioxide pressure of less than about 10 atmosphere.

10. The process of claim 1, wherein the electrolysis is conducted with a carbon dioxide pressure of greater than about 10 atmosphere.

11. The process of claim 1, wherein the energy used to electrolyze the molten calcium carbonate is obtained from nuclear, solar, wind, or hydroelectric energy.

12. The process of claim 1, further comprising collecting the calcium oxide from the bottom of the electrolysis vessel.

13. A process for producing calcium oxide comprising heating calcium carbonate in a vessel to produce calcium oxide and hot carbon dioxide gas; directing said hot carbon dioxide gas into a molten carbonate; and electrolyzing said molten carbonate to generate oxygen and a reduced carbon product, wherein the calcium oxide collects on the bottom of the vessel.

14. The process of claim 13, wherein the reduced carbon product is solid carbon.

15. The process of claim 13, wherein the reduced carbon product is carbon monoxide.

16. The process of claim 13, wherein said molten carbonate comprises lithium carbonate, potassium carbonate, sodium carbonate, barium carbonate, lithium oxide, potassium oxide, sodium oxide, barium oxide, or combinations thereof.

17. The process of claim 13, wherein said molten carbonate is heated by solar thermal energy.

18. The process of claim 13, wherein said electrolysis is powered by non-fossil fuel generated electricity.

19. The process of claim 18, wherein said non-fossil fuel generated electricity is generated by renewable energy.

20. The process of claim 18, wherein said non-fossil fuel generated electricity is produced by nuclear, solar energy, wind, or hydroelectric energy.

21. The process of claim 13, wherein the hot carbon dioxide gas is at a temperature of greater than about 900° C.

22. The process of claim 13, further comprising collecting the calcium oxide from the bottom of the vessel.

* * * * *